US009800123B2

(12) United States Patent
Zhang et al.

(10) Patent No.: US 9,800,123 B2
(45) Date of Patent: Oct. 24, 2017

(54) METHOD FOR MODIFYING STATOR TOOTH TOP ARC OF BRUSHLESS DC MOTOR

(71) Applicant: ZHEJIANG YILIDA VENTILATOR CO., LTD., Taizhou (CN)

(72) Inventors: Qizhong Zhang, Taizhou (CN); Wei Zhang, Taizhou (CN)

(73) Assignee: ZHEJIANG YILIDA VENTILATOR CO., LTD., Zhejiang (CN)

( * ) Notice: Subject to any disclaimer, the term of this patent is extended or adjusted under 35 U.S.C. 154(b) by 611 days.

(21) Appl. No.: 14/504,335

(22) Filed: Oct. 1, 2014

(65) Prior Publication Data
US 2015/0013147 A1 Jan. 15, 2015

Related U.S. Application Data

(63) Continuation-in-part of application No. 13/747,379, filed on Jan. 22, 2013, now abandoned, which is a
(Continued)

(30) Foreign Application Priority Data

Mar. 5, 2012 (CN) .......................... 2012 1 0055354

(51) Int. Cl.
*H02K 1/14* (2006.01)
*H02K 15/02* (2006.01)
*H02K 29/03* (2006.01)

(52) U.S. Cl.
CPC ........... *H02K 15/022* (2013.01); *H02K 1/146* (2013.01); *H02K 29/03* (2013.01); *H02K 2213/03* (2013.01); *Y10T 29/49009* (2015.01)

(58) Field of Classification Search
CPC ........ H02K 29/03; H02K 21/22; H02K 1/145; H02K 1/146; H02K 1/14; H02K 1/148
(Continued)

(56) References Cited

U.S. PATENT DOCUMENTS 5,041,749 A 8/1991 Gaser et al. .................. 310/156
5,670,836 A 9/1997 Horst ............................ 310/156
(Continued)

FOREIGN PATENT DOCUMENTS

AU 2012372145 B2 7/2012
CN 1881746 A 12/2006
(Continued)

OTHER PUBLICATIONS

Japanese Examination Report of corresponding Japan patent application No. 2014-502984, dated Sep. 30, 2014.
(Continued)

*Primary Examiner* — Terrance Kenerly
(74) *Attorney, Agent, or Firm* — J.C. Patents

(57) ABSTRACT

The present invention provides a method for modifying a stator tooth top arc of brushless DC motor, including: detecting motor parameters; determining an angle θ between initial slot axis and eccentric slot axis; determining a first arc by taking the rotating center of rotor as the center, and taking a first radius $R_{i1}$ as the radius, where, the first arc intersects with eccentric slot axis at a first intersection point; determining a second arc by taking the first intersection point as the center, and taking a second radius R as the radius, wherein, the second arc intersects with eccentric slot axis at a second intersection point; determining a third arc of the first intersection point by taking the second intersection point as the center, and taking a radius of R as the radius, and modifying the stator tooth top arc according to the third arc to form a modified stator tooth top arc.

6 Claims, 8 Drawing Sheets

Related U.S. Application Data continuation of application No. PCT/CN2012/079102, filed on Jul. 24, 2012.

(58) Field of Classification Search
USPC .................. 310/219.092, 216.096, 216.097
See application file for complete search history.

(56) References Cited

U.S. PATENT DOCUMENTS

| | | | |
|---|---|---|---|
| 5,744,893 A | 4/1998 | Zhao et al. ................. | 310/259 |
| 6,744,171 B1 | 6/2004 | Kolomeitsev ................ | 310/254 |
| 7,242,160 B2 | 7/2007 | Wang et al. ................. | 318/254 |
| 2002/0011814 A1 | 1/2002 | Nakajima ................... | 318/491 |
| 2002/0105244 A1 | 8/2002 | Wauke ........................ | 310/180 |
| 2005/0264122 A1 | 12/2005 | Domeki et al. ........... | 310/156.46 |
| 2008/0097260 A1 | 4/2008 | Tsukada et al. ............. | 601/98 |
| 2010/0050702 A1 | 3/2010 | Kim et al. ................... | 38/23 R |

FOREIGN PATENT DOCUMENTS

| | | |
|---|---|---|
| CN | 201319527 Y | 9/2009 |
| DE | 202005002828 U1 | 2/2003 |
| FR | 2 945 388 A1 | 11/2010 |
| JP | 60-183958 A | 9/1985 |
| JP | 02-022069 U | 2/1990 |
| JP | H07-227073 A | 8/1995 |
| JP | H08-317619 A | 11/1996 |
| JP | H10-285839 A | 10/1998 |
| JP | 2004-208341 A | 7/2004 |
| JP | 2006-333585 A | 12/2006 |
| JP | 2006-352961 A | 12/2006 |
| JP | 2007-166880 A | 6/2007 |
| JP | 2008-178258 A | 7/2008 |
| JP | 2009-254030 A | 10/2009 |
| JP | P4738759 B2 | 5/2011 |

OTHER PUBLICATIONS

Australian Patent Examination Report No. 1 of corresponding Australia patent application No. 2012372145, dated Mar. 2014.
Canadian Examination Report of corresponding Canada patent application No. 2,806,050, dated Jun. 5, 2014.
Chinese First Examination Report of corresponding China patent application No. 201210055354.7, dated Oct. 9, 2012.
International Search Report of corresponding International PCT application No. PCT/CN2012/079102, dated Dec. 13, 2012.
Supplementary European Search Report of corresponding European application No. 12826593.1, dated Apr. 4, 2014.
Japanese Examination Report of corresponding Japan patent application No. 2014-502984, dated Apr. 1, 2014.
Korean Examination Report of corresponding Republic of Korea patent application No. Oct. 10-2013-7006202, dated May 15, 2014.
European official examination report of corresponding European application No. 12826593.1, dated Apr. 2, 2015.
The Malaysia Substantive Examination Adverse Report of corresponding Malaysia patent application No. PI 2013000474, dated Jan. 15, 2016.

METHOD FOR MODIFYING STATOR TOOTH TOP ARC OF BRUSHLESS DC MOTOR

CROSS-REFERENCE TO RELATED APPLICATIONS

This application is a continuation-in-part of U.S. application Ser. No. 13/747,379, filed on Jan. 22, 2013, which is a continuation of International Application No. PCT/CN2012/079102, filed on Jul. 24, 2012, which claims the priority benefit of Chinese Patent Application No. 201210055354.7, filed on Mar. 5, 2012. The contents of the above identified applications are incorporated herein by reference in their entireties.

TECHNICAL FIELD

The present invention relates to the motor technology, and particularly to a method for modifying a stator tooth top arc of a brushless DC motor.

BACKGROUND

A brushless direct current, (Direct Current, DC) motor is a major type of motor, and a basic structure of the existing brushless DC motor is shown in FIG. 1, which shows a schematic cross-sectional diagram of a stator in a brushless DC motor in the prior art. In a cross section of the stator perpendicular to an axis of a rotating center of the rotor, including a stator 1 having paired stator teeth, a rotor 2 having paired magnetic poles and a rotating shaft fixed in the rotating center 3 of the rotor, where each of the stator teeth 11 is wound with a winding. The stator 1 includes a stator outer circle and stator teeth 11, each of the stator teeth 11 consists of a tooth root and a tooth top. The tooth root, of which the shape is of axially symmetric plate-like, extends from the stator outer circle towards the rotating center 3 of the rotor, and two sides of the tooth top respectively extend from two sides of the tooth root to form a slot 13 of a cogging 12; the center of the tooth top arc 111 for each stator teeth 11 is located at the rotating center 3 of the rotor. The working principle of the brushless DC motor is that, a driving current commutated according to a set period is applied to the winding to produce a changing magnetic field between the stator teeth and rotor magnetic poles, such that an electromagnetic torque is produced on the rotor to drive the rotor to rotate.

There is a general defect in the prior art, that is, in a half commutating period of the brushless DC motor, both the electromagnetic torques are zero when the phase angle between the magnetomotive force of the stator and the magnetic flux of the rotor is 0 degree and 180 degrees. Therefore, these two positions are called "dead points", when the rotor is in the vicinity of the "dead point", the starting torque of the motor acting on the rotor is very small, and thus the motor is difficult to start. With respect to the defect in the prior art, in the commonly-used four types of stator structures (graded air-gap structure, stepped air-gap structure, asymmetric teeth structure, additional groove structure) with asymmetric air-gaps in the prior art, by acquiring an asymmetric reluctance torque, which generates an oriented torque after combined with a permanent magnetic torque, a total resultant torque generated in the vicinity of the dead point appears to be a positive torque, so as to avoid the "dead point". However, all these asymmetric air-gap structures are provided by changing the shape of the tooth top arc 111 of the stator teeth 11. For details, please refer to FIGS. 2-5, in the graded air-gap structure, different tooth top arcs of the stator teeth have the same center but have different radii R11, R12, R13, R14 and R15; in the stepped air-gap structure, the tooth top arc surface of the same stator tooth forms a suddenly changed step t; in the asymmetric teeth structure, the symmetry axis k2 of the tooth top cylindrical surface of each stator tooth deviates from the symmetry axis k1 of the stator tooth; in the additional groove structure, a groove h is provided on one side of the symmetry axis of the tooth top cylindrical surface of each stator tooth.

Since the center axes of the tooth top cylindrical surface of the stator tooth in all four types of stator structures in the prior art lie in the rotating center of the rotor, such that sudden changes exist in the air-gaps between different stator teeth and the rotors, causing the reluctance torque to have a positive peak and a negative peak within a pole pitch, namely, showing a high torque ripple, making vibration of the motor increased and meanwhile a power density of the motor reduced, thus the power of the motor is small and the efficiency is not too high.

SUMMARY

The present invention provides a method for modifying a stator tooth top arc of a brushless DC motor, so as to solve the starting "dead point" problem of the motor, reducing ripple of the electromagnetic torque, and improving stability of the motor.

The present invention provides a method for modifying a stator tooth top arc of a brushless DC motor, including:

detecting motor parameters of the brushless DC motor, where the motor parameters include: a number of slots Z, a number of pole-pairs P, an eccentric correction parameter $K_1$, a rotor radius $R_{21}$, a motor air-gap length $\delta$, an eccentric radius coefficient $K_3$, a starting coefficient $K_2$ and a preset slot height H;

determining an angle $\theta$ between an initial slot axis and an eccentric slot axis in a cross section of a stator perpendicular to a rotating center axis of a rotor, where the initial slot axis is a central axis of the slot between two adjacent stator teeth, $\theta=360/(Z+P)/(Z-P)\times K_1$;

determining a first arc by taking the rotating center of the rotor as the center, and taking a first radius $R_{i1}$ as the radius, where, the first arc intersects with the eccentric slot axis at a first intersection point, when the stator is arranged at the inner side of the rotor, $R_{i1}=R_{21}-\delta$, when the stator is arranged at the outer side of the rotor, $R_{i1}=R_{21}+\delta$;

determining a second arc by taking the first intersection point as the center, and taking a second radius R as the radius, where, the second arc intersects with the eccentric slot axis at a second intersection point, when the stator is arranged at the outer side of the rotor, $R=R_{i1}+(K_2+\sin(360/(2\times Z)-\theta))\times H\times K_3$, when the stator is arranged at the inner side of the rotor, $R=R_{i1}-(K_2+\sin(360/(2\times Z)-\theta))\times H\times K_3$;

determining a third arc of the first intersection point by taking the second intersection point, and taking a radius of R as the radius, and modifying the stator tooth top arc according to the third arc to form a modified stator tooth top arc.

In the method for modifying the stator tooth top arc of the brushless DC motor provided by the present invention, the tooth top circle of the stator tooth is modified to be an arc eccentric relative to the rotating center of the rotor, and extends to both sides from the first intersection point, such that the brushless DC motor can eliminate the starting "dead

DESCRIPTION OF EMBODIMENTS

Figure 1:
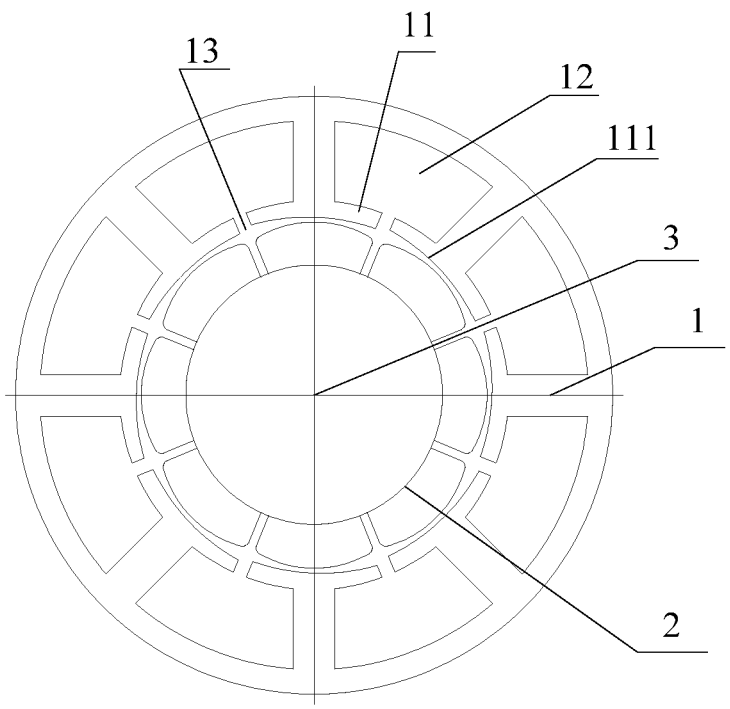
FIG. 1 is a schematic cross-sectional diagram of a stator in a brushless DC motor in the prior art.
Figure 2:
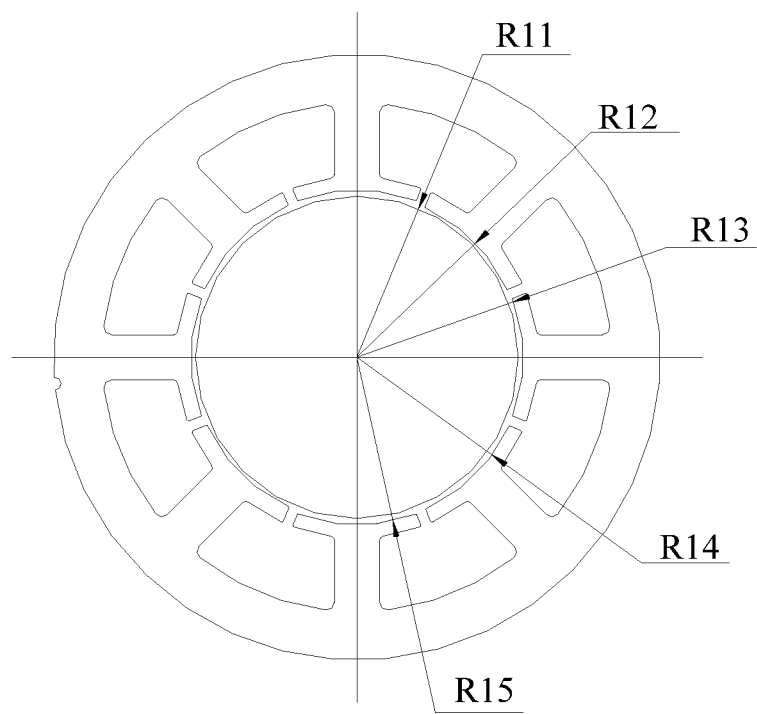
FIG. 2 is a schematic structural diagram of adopting a graded air-gap structure in the prior art.
Figure 3:
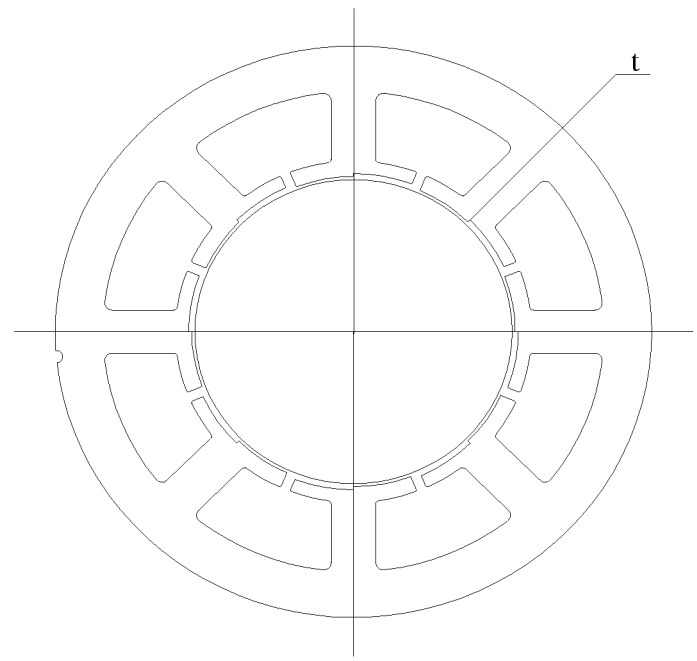
FIG. 3 is a schematic structural diagram of adopting a stepped air-gap structure in the prior art.
Figure 4:
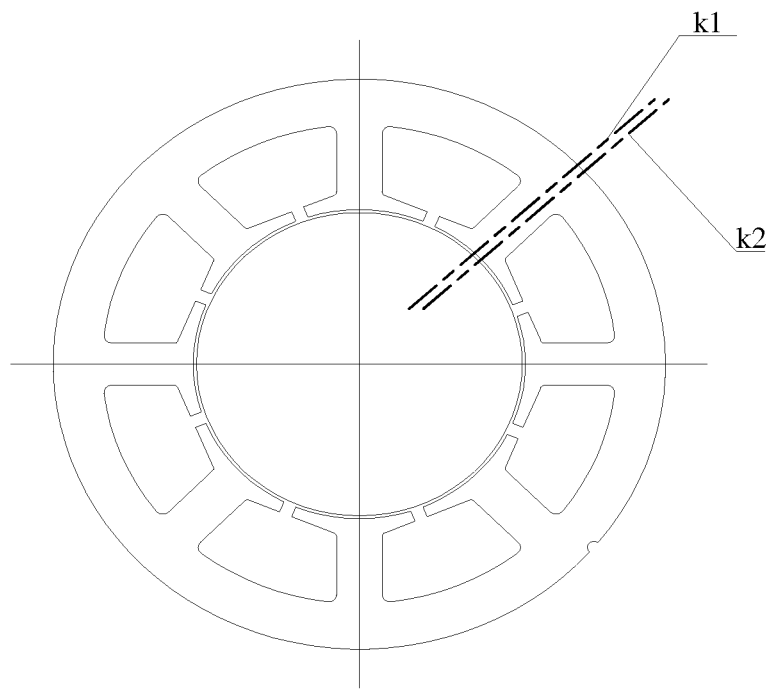
FIG. 4 is a schematic structural diagram of adopting an asymmetric teeth structure in the prior art.
Figure 5:
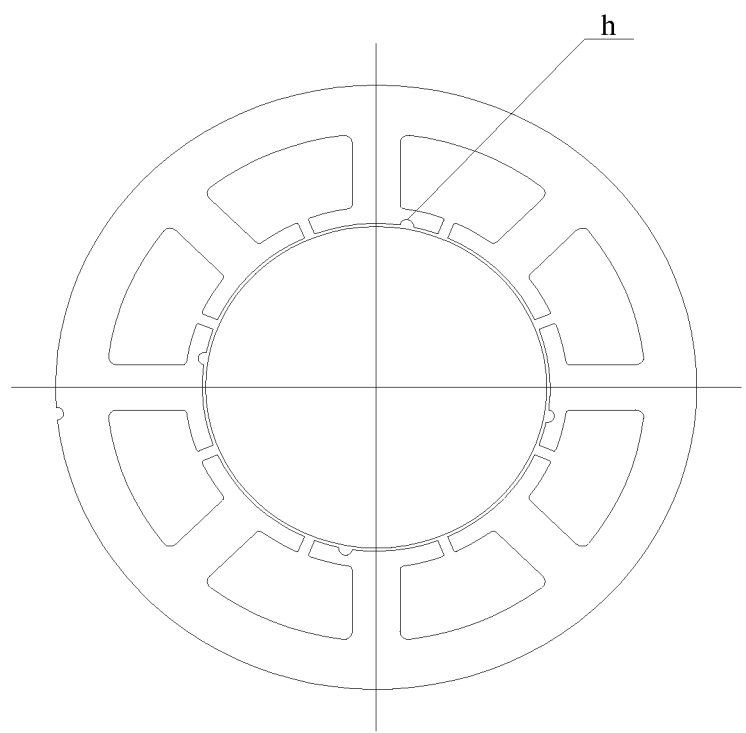
FIG. 5 is a schematic structural diagram of adopting an additional groove structure in the prior art.
Figure 6:
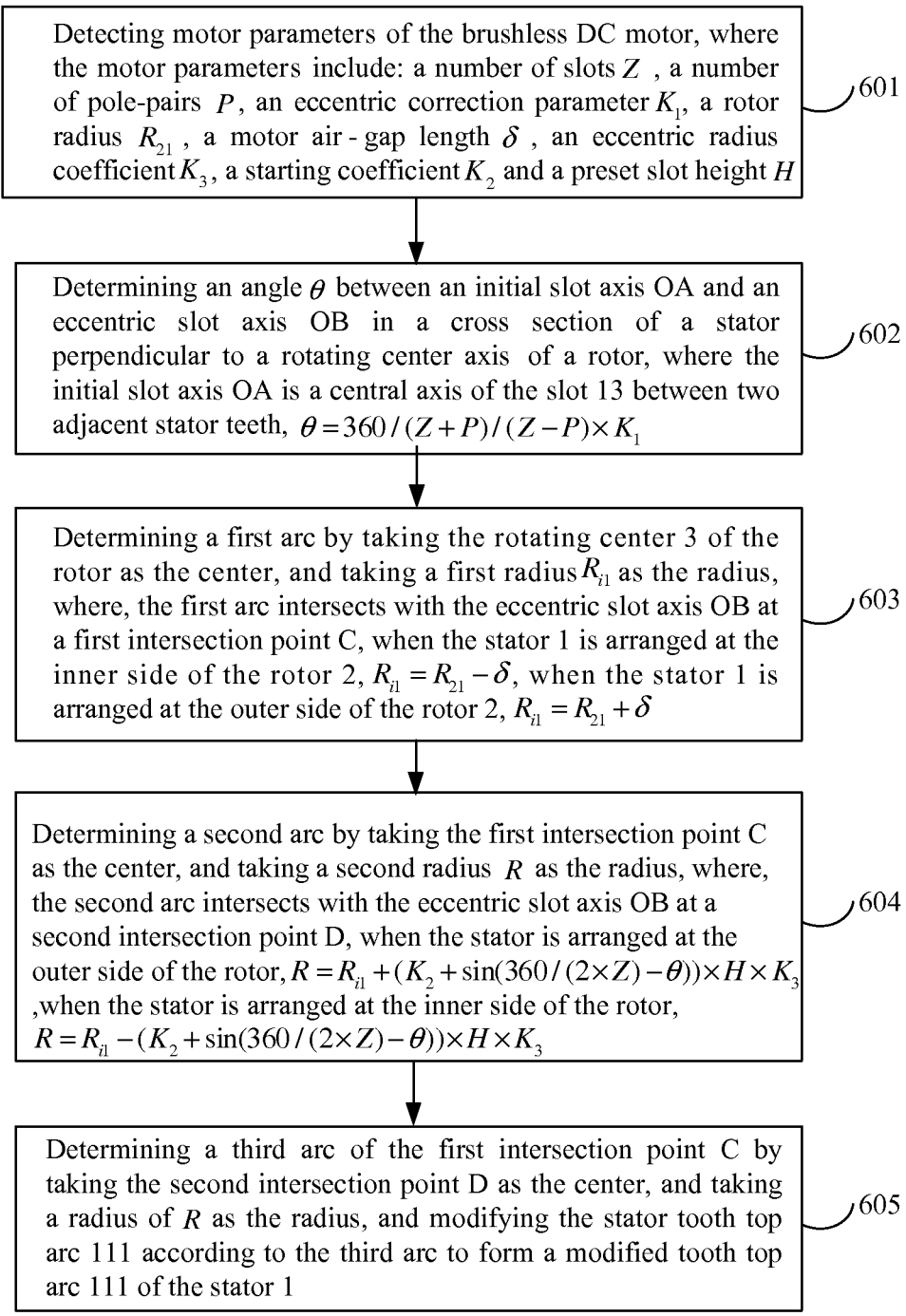
FIG. 6 is a flow chart of a method for modifying a stator tooth top arc of a brushless DC motor according to the present invention.
Figure 7:
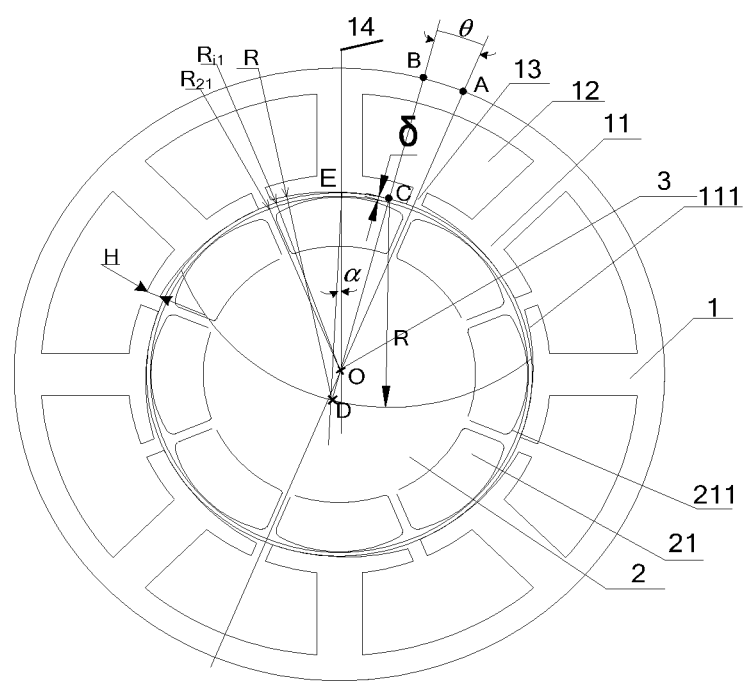
FIG. 7 is a schematic cross-sectional diagram of a stator in an inner rotor motor according to the present invention.
Figure 8:
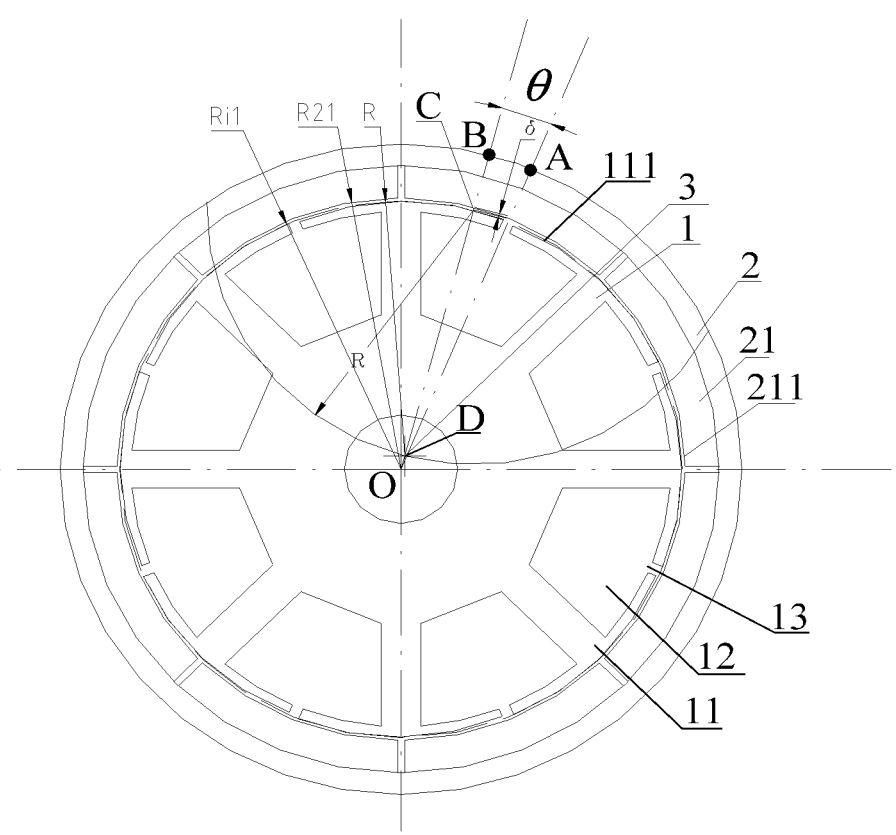
FIG. 8 is a schematic cross-sectional diagram of a stator in an outer rotor motor according to the present invention.

FIG. 6 is a flow chart of a method for modifying a stator tooth top arc of a brushless DC motor according to an embodiment of the present invention, FIG. 7 is a schematic cross-sectional diagram of a stator in an inner rotor motor according to an embodiment of the present invention, and FIG. 8 is a schematic cross-sectional diagram of a stator in an outer rotor motor according to an embodiment of the present invention. The method for modifying the stator tooth top arc of the brushless DC motor in this embodiment is suitable for an outer rotor motor with rotors arranged at the outer side of stators, as well as for an inner rotor motor with rotors arranged at the inner side of stators. FIG. 7 shows a structure of an inner rotor motor with rotors arranged at the inner side of stators, FIG. 8 shows a structure of an outer rotor motor with rotors arranged at the outer side of stators, and the method in this embodiment includes:

Step 601, detecting motor parameters of the brushless DC motor, where the motor parameters include: a number of slots Z, a number of pole-pairs P, an eccentric correction parameter $K_1$, a rotor radius $R_{21}$, a motor air-gap length $\delta$, an eccentric radius coefficient $K_3$, a starting coefficient $K_2$ and a preset slot height H.

Particularly, the number of slots Z is the number of coggings 12 of the stator formed between two adjacent stator teeth 11, and the number of slots Z equals to the number of the stator teeth 11; the number of pole-pairs P is the number of pairs of magnetic poles 21, which appear in pairs, on the rotor 2 having paired magnetic poles; the rotor radius $R_{21}$ is the distance from a center of the rotating center 3 of the rotor 2 to the rim arc 211 of the rotor magnetic pole 21; moreover, it should be noted that, when the stator 1 is arranged at an inner side of the rotor 2, the rim arc of each magnetic pole 21 is concave, or, when the stator 1 is arranged at an outer side of the rotor 2, the rim arc of each magnetic pole 21 is convex; the motor air-gap length $\delta$ is the length of the air-gap formed between the stator teeth 11 and the rim arc 211 of the rotor magnetic pole 21; the eccentric correction parameter $K_1$, the starting coefficient $K_2$ and the eccentric radius coefficient $K_3$ can be synthetically determined by technicians according to a starting torque, a power, a rotating speed, a number of pole-pairs, a number of slots, and an electrical angle and a motor utilization coefficient of the motor, and the present invention is not limited thereto.

Step 602, determining an angle $\delta$ between an initial slot axis OA and an eccentric slot axis OB in a cross section of a stator perpendicular to a rotating center axis of a rotor, where the initial slot axis OA is a central axis of the slot 13 between two adjacent stator teeth, $\theta=360/(Z+P)/(Z-P)\times K_1$.

Particularly, the initial slot axis OA at the slot 13 of any cogging 12 of the stator 1 is rotated by an angle of $\delta$, O is a reference number of the rotating center 3 of the rotor, in FIG. 7, A is the intersection point of the initial slot axis OA and the outermost circle of the stator; in FIG. 8, A is the intersection point $\theta$ of the initial slot axis OA and the outermost circle of the rotor, and $\theta$ is determined according to the number of slots Z, the number of pole-pairs P and the eccentric correction parameter $K_1$ obtained in step 601. Preferably, a range of the eccentric correction parameter $K_1$ is $0.75 \leq K_1 \leq 1.25$.

Step 603, determining a first arc by taking the rotating center 3 of the rotor as the center, and taking a first radius $R_{i1}$ as the radius, where, the first arc intersects with the eccentric slot axis OB at a first intersection point C, when the stator 1 is arranged at the inner side of the rotor 2, $R_{i1}=R_{21}-\delta$, when the stator 1 is arranged at the outer side of the rotor 2, $R_{i1}=R_{21}+\delta$.

Particularly, O is a reference number of the rotating center 3 of the rotor, in FIG. 7, B is the intersection point of the initial slot axis OA, after rotating by $\theta$, and the outermost circle of the stator; in FIG. 8, B is the intersection point of the initial slot axis OA, after rotating by $\theta$, and the outermost circle of the rotor.

Step 604, determining a second arc by taking the first intersection point C as the center, and taking a second radius R as the radius, where, the second arc intersects with the eccentric slot axis OB at a second intersection point D, when the stator is arranged at the outer side of the rotor, $R=R_{i1}+(K_2+\sin(360/(2\times Z)-\delta))\times H\times K_3$, when the stator is arranged at the inner side of the rotor, $R=R_{i1}-(K_2+\sin(360/(2\times Z)-\theta))\times H\times K_3$.

In this embodiment, preferably, a range of the starting coefficient $K_2$ is $0 \leq K_2 \leq 4$, and a range of the eccentric radius coefficient $K_3$ is $0.7 \leq K_3 \leq 1.3$.

Step 605, determining a third arc of the first intersection point C by taking the second intersection point D as the center, and taking a radius of R as the radius, and modifying the stator tooth top arc 111 according to the third arc to form a modified tooth top arc 111 of the stator 1.

Figure 9:
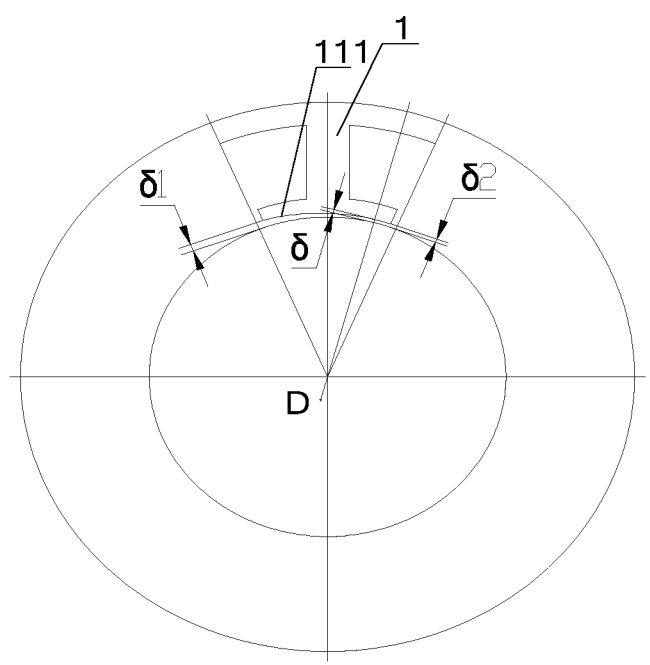
FIG. 9 is a schematic diagram of the stator air-gap of the brushless DC motor according to the present invention.

Particularly, the first intersection point C is located on the third arc, namely, on the modified tooth top arc 111 of the stator 1, and the first intersection point C is called a convex pole, where the air-gap between the stator teeth 11 and the rotor magnetic pole 21 is minimum, and then the motor air-gap length $\delta$ increases gradually from the convex pole toward two sides of the modified stator tooth top arc 111. As shown in FIG. 9, a schematic diagram of the stator air-gap of the brushless DC motor according to an embodiment of the present invention, it can be seen that $\delta_1 > \delta_2 > \delta$, where, $\delta$ is the air-gap length at the convex pole, $\delta_1$ is the air-gap length at the left rim of the tooth top arc 111, and $\delta_2$ is the air-gap length at right rim of the tooth top arc 111; it should be noted that, the relationship of $\delta_1 > \delta_2 > \delta$ is only an example, and the specific sizes of $\delta_1$ and $\delta_2$ can be determined by technicians depending on actual application working conditions of the motor. Such a structure that the air-gap becomes smaller and then bigger on the tooth top arc 111 of the stator 1 makes easy for the brushless DC motor to form a motor sinusoidal wave counter electromotive force, and meanwhile since the air-gap changes uniformly, the air-gap magnetic field changes smoothly, thereby effectively reducing the ripple of the output electromagnetic torque, which further reduces vibration of the motor during working, and improves stability of the motor.

The method for modifying the stator tooth top arc of the brushless DC motor according to this embodiment is as shown in FIG. 7, in each cross section of the stator 1, the connecting line ED between the intersection point E of a tooth top arc 111 of the stator tooth 11 and a tooth axis 14 (the tooth axis 14 is the connecting line between the center of the tooth root and the rotating center 3 of the rotor) of the stator tooth 11 and the center D of the tooth top arc 111 of the stator tooth 11 always forms an eccentric angle $\alpha$ with the tooth axis 14 of the stator tooth 11, preferably, the $\alpha$ is more than 0 degree and less than 45 degrees, so that the electromagnetic torque generated by the current of the stator will not equal to zero, thus eliminating the starting "dead point" of the motor. Persons skilled in the art can calculate the specific value of the eccentric angle $\alpha$ from formulas of trigonometric function.

Figure 10:
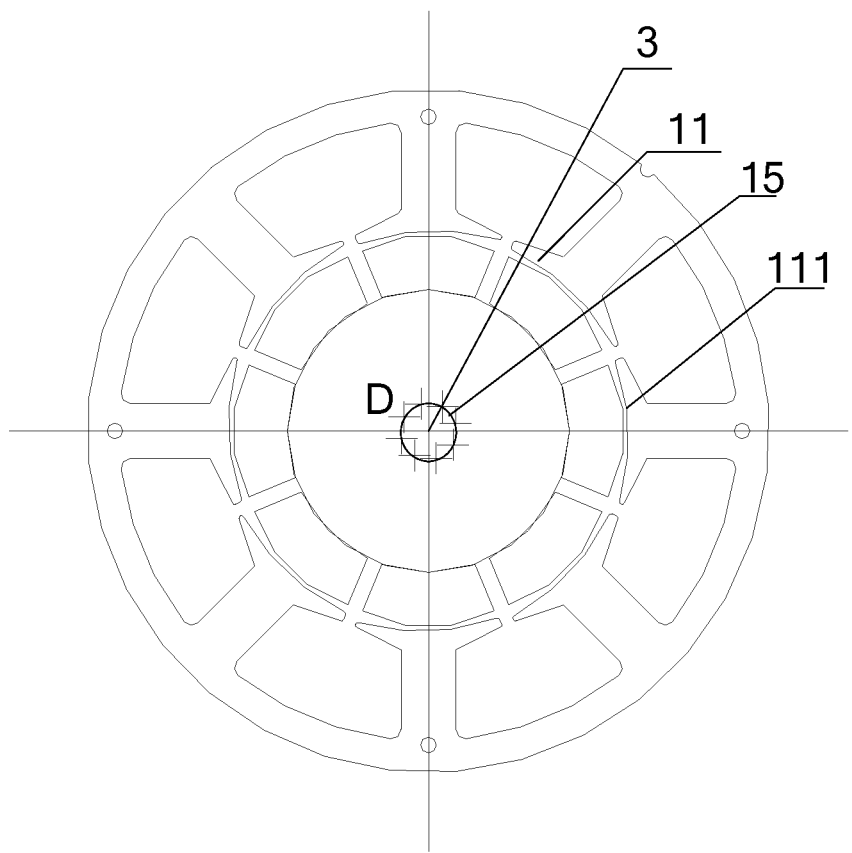
FIG. 10 is a schematic diagram of an eccentric stator circle of the brushless DC motor according to the present invention.

Preferably, the modified eccentric angles $\alpha$ of the each stator teeth 11 above are the same; the radii of the tooth top arc 111 of each above stator tooth 11 are the same. Viewed from any cross section of the stator tooth, when the eccentric angles $\alpha$ of the stator teeth 11 are the same; and the corresponding radii of the tooth top arc 111 of each stator tooth 11 above are also the same, in each cross section of the stator 1, the center D of the tooth top arc 111 of each stator tooth 11 is continuously arranged in sequence, forming a stator circle 15 surrounding the outer side of the rotating center 3 of the rotor (as shown in FIG. 10, a schematic diagram of an eccentric stator circle of the brushless DC motor according to an embodiment of the present invention).

The stator 1 has an eccentric tooth top arc 111, when the rotor 2 rotates, the size of the eccentric angle $\alpha$ remains unchanged, but the magnetic-field vector between the stator teeth 11 and the rotor magnetic poles 21 changes; that is to say, when the motor rotates with a constant rotation speed after started, the position of the eccentric angle $\alpha$ remains unchanged, the magnetic-field vector changes uniformly along with the rotation of the rotor, the obtained reluctance torque is of a smooth sinusoidal wave shape, and thus the ripple of the electromagnetic torque output by the motor can be reduced.

In the method for modifying the stator tooth top arc of the brushless DC motor in this embodiment, the shape of the tooth top arc of the stator tooth is modified to an eccentric arc relative to the rotating center of the rotor, and the arc extends from the first intersecting point (convex pole) to the two sides, so that the brushless DC motor can eliminate the starting "dead point" and start successfully, and the tooth top arc extends from the convex pole to the two sides to form a uniformly variable air-gap magnetic field, thus reducing ripple of the electromagnetic torque, and improving stability of the motor.

On the basis of the above embodiments, after step 605, further, the method in this embodiment can also include: a rotor position sensor detects the current phase position of the rotor, outputs a corresponding phase position signal of the rotor, and sends the phase position signal of the rotor to a controller; the controller generates a driving current signal following the rule of sinusoidal wave and outputs the signal to a winding of the stator to achieve a phase change.

In this embodiment, the rotor position sensor specifically can be a Hall sensor for acquiring a magnetic induction signal, the Hall sensor is arranged on the modified stator tooth top arc, within one degree between two sides of the first intersection point.

Particularly, in practical implementations, the controller and the winding of the stator can be connected with the driving circuit, so as to change the direction of the driving current via the controller to achieve a phase change, that is, the brushless DC motor of the present invention can be driven by a sinusoidal current signal, and make the counter electromotive force of the winding follow the rule of sinusoidal wave by means of an advance phase change realized by the phase compensating effect of the controller in combination with the rotating direction of the rotor acquired by the position Hall sensor, such that the air-gap magnetic field is changed following the rule of a much more formal sinusoidal wave, the torque ripple can be further reduced, the efficiency of the motor is improved and the noise reduction effect is much better.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to some technical features in the technical solutions; however, such modifications or replacements do not cause the essence of corresponding technical solutions to depart from the spirit and scope of the embodiments of the present invention.

What is claimed is:

1. A method for modifying a stator tooth top arc of a brushless DC motor, characterized by comprising:

detecting motor parameters of the brushless DC motor, wherein the motor parameters comprise: a number of slots Z, a number of pole-pairs P, an eccentric correction parameter $K_1$, a rotor radius $R_{21}$, a motor air-gap length $\delta$, an eccentric radius coefficient $K_3$, a starting coefficient $K_2$ and a preset slot height H;

determining an angle $\theta$ between an initial slot axis and an eccentric slot axis in a cross section of a stator perpendicular to a rotating center axis of a rotor, wherein the initial slot axis is a central axis of the slot between two adjacent stator teeth, $\theta=360/(Z+P)/(Z-P)\times K_1$;

determining a first arc by taking the rotating center of the rotor as the center, and taking a first radius $R_{i1}$ as the radius, wherein, the first arc intersects with the eccentric slot axis at a first intersection point, when the stator is arranged at the inner side of the rotor, $R_{i1}=R_{21}-\delta$, when the stator is arranged at the outer side of the rotor, $R_{i1}=R_{21}+\delta$;

determining a second arc by taking the first intersection point as the center, and taking a second radius R as the radius, wherein, the second arc intersects with the eccentric slot axis at a second intersection point, when the stator is arranged at the outer side of the rotor, $R=R_{i1}+(K_2+\sin(360/(2\times Z)-\theta))\times H\times K_3$, when the stator is arranged at the inner side of the rotor, $R=R_{i1}-(K_2+\sin(360/(2\times Z)-\theta))\times H\times K_3$;

determining a third arc of the first intersection point by taking the second intersection point as the center, and taking a radius of R as the radius, and modifying the stator tooth top arc according to the third arc to form a modified stator tooth top arc.

2. The method according to claim 1, characterized in that: a range of the eccentric correction parameter $K_1$ is $0.75 \leq K_1 \leq 1.25$, a range of the starting coefficient $K_2$ is $0 \leq K_2 \leq 4$, and a range of the eccentric radius coefficient $0.7 \leq K_3 \leq 1.3$.

3. The method according to claim 1, characterized in that: the modified stator tooth top arcs have the same radius.

4. The method according to claim 1, characterized in that: in a cross section of the stator perpendicular to the rotating center of the rotor, the center of each modified stator tooth top arc is continuously arranged in sequence, forming a stator circle surrounding the outer side of the rotating center of the rotor.

5. The method according to claim 1, characterized in that: after forming the modified stator tooth top arc, further comprising:
 detecting, by a rotor position sensor, a current position of the rotor, outputting a corresponding phase position signal of the rotor, and sending the phase position signal of the rotor to a controller;
 generating, by the controller, a driving current signal following the rule of a sinusoidal wave and output the signal to a winding of the stator to achieve a phase change.

6. The method according to claim 5, characterized in that: the rotor position sensor is a Hall sensor for acquiring a magnetic induction signal, the Hall sensor is arranged on the modified stator tooth top arc, within one degree between two sides of the first intersection point.

\* \* \* \* \*